United States Patent
Beard

(10) Patent No.: US 7,230,971 B1
(45) Date of Patent: Jun. 12, 2007

(54) RANDOM NUMBER GENERATOR

(75) Inventor: Paul Beard, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 772 days.

(21) Appl. No.: 10/147,828

(22) Filed: May 17, 2002

Related U.S. Application Data

(60) Provisional application No. 60/291,713, filed on May 17, 2001.

(51) Int. Cl.
- H04B 1/69 (2006.01)
- H04B 1/707 (2006.01)
- H04B 1/713 (2006.01)

(52) U.S. Cl. .................. 375/132; 375/130; 342/131

(58) Field of Classification Search ............. 375/132, 375/130; 342/131
See application file for complete search history.

(56) References Cited

U.S. PATENT DOCUMENTS 5,353,341 A * 10/1994 Gillis et al. ............... 455/464
5,966,665 A * 10/1999 Taki .......................... 455/463
6,091,758 A *  7/2000 Ciccone et al. ............ 375/132
6,732,163 B1 *  5/2004 Halasz ....................... 709/220

* cited by examiner

Primary Examiner—Chieh M. Fan
Assistant Examiner—Anna Ziskind
(74) Attorney, Agent, or Firm—Marger Johnson & McCollom, P.C.

(57) ABSTRACT

The present invention is a method and apparatus for providing a pseudo random sequence for a spread spectrum system that prevents interception and provides real estate and power consumption efficiency. A pseudo random sequence may be created in real-time by associating a pseudo random sequence of a channel location of the carrier frequency at an instant in time. For example, the entire band of the spread spectrum system may be scanned to detect a channel with a low received signal strength. The location of the channel, or the actual frequency of the channel, could be associated with a particular pseudo random sequence to create a hop set for frequency hopping. Additionally, the location of a characteristic of the spread spectrum system, such as a noise characteristic, could be utilized to determine a content of a pseudo random sequence.

23 Claims, 5 Drawing Sheets

RANDOM NUMBER GENERATOR

CROSS REFERENCE TO RELATED APPLICATIONS

The present application claims the benefit under 35 U.S.C. § 119 of U.S. Provisional Application Ser. No. 60/291,713 filed on May 17, 2001. Said U.S. Provisional Application Ser. No. 60/291,713 is hereby incorporated by reference.

FIELD OF THE INVENTION

The present invention generally relates to the field of random number generation, and more particularly to a method and apparatus for generating a pseudo random hop set in a frequency hopping spread spectrum communication system.

BACKGROUND OF THE INVENTION

Wireless communications have become popular as a reliable and cost-effective alternative to hard-wire communication transfer. Along with infrared and microwave radio, spread spectrum technology is employed in many wireless communication systems. Spread spectrum is a type of modulation that scatters data transmission across an available frequency band in a pseudo-random pattern. Thus, spread spectrum employs a signal resistant to noise, interference, and eavesdropping. Additionally, spread spectrum is an efficient way to use radio waves as multiple users may share radio frequencies at the same time without interfering with each other.

In a spread spectrum signal, a modulated carrier is further modulated by a spreading code that spreads the signal over a larger bandwidth. This may be accomplished through a direct sequence system, frequency hopping, and time hopping. Direct sequence and frequency hopping systems utilize pseudo random sequences to spread a signal across the entire bandwidth. Direct sequence utilizes a pseudo random sequence to encode transmitted digital data to randomize the output spectrum wherein frequency hopping utilizes a pseudo random sequence to randomly alter the center frequency of the carrier from a set of frequencies.

The employment of pseudo random sequences makes spread spectrum appear wide band and noise-like. This characteristic is advantageous because it provides intercept prevention. Spread spectrum signals are difficult to detect on narrow band equipment because the signal's energy is spread over a bandwidth many times greater than the information bandwidth. The utilization of a pseudo random sequence is further advantageous because a transmitter and receiver may each execute the same pseudo random sequence to aid in the synchronization of multiple users.

A drawback associated with conventional schemes for generating pseudo random sequences known to the art is the ability of an eavesdropper to intercept the random sequence. For example, a potential eavesdropper may effectively learn a hop set created from the pseudo random sequence for a frequency hopping spread spectrum system by measuring the time between control point beacons on separate channels. As a result, an eavesdropper may have the capability of intercepting spread spectrum signals upon determining the pseudo random sequence.

Another disadvantage to utilization of pseudo random sequences is the requirement of additional hardware or processor operation to generate the pseudo random sequences. Hardware random number generators require the use of a resistor and detection equipment designed to measure the noise present across the resistor. Other types of hardware random number generators may include shift registers and logic circuitry. Thus, hardware random number generators require additional components that add cost and occupy chip real estate on a spread spectrum radio. Software random number generators utilize a program of instructions executed by a microprocessor. The microprocessor performs multiple iterations of an algorithm to generate a pseudo random sequence. This requires additional processor action which increases power consumption. Spread spectrum technology is frequently employed in remote, battery-powered devices in which space and power consumption is restricted. Consequently, a method and apparatus for generating a pseudo random number for a spread spectrum system that prevents interception and provides real estate and power consumption efficiency is necessary.

SUMMARY OF THE INVENTION

Accordingly, the present invention is directed to a method and apparatus for providing a pseudo random sequence for a spread spectrum system that prevents interception and provides real estate and power consumption efficiency. In an embodiment of the invention, the method and apparatus may generate a pseudo random sequence in real-time based on the channel location of the carrier frequency. For example, the entire band of the spread spectrum system may be scanned to detect a channel with a low received signal strength, or alternatively, to detect noise. The location of the channel, or the actual frequency of the channel, could be associated with a particular pseudo random sequence via a look-up table or similar implementation for frequency hopping.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
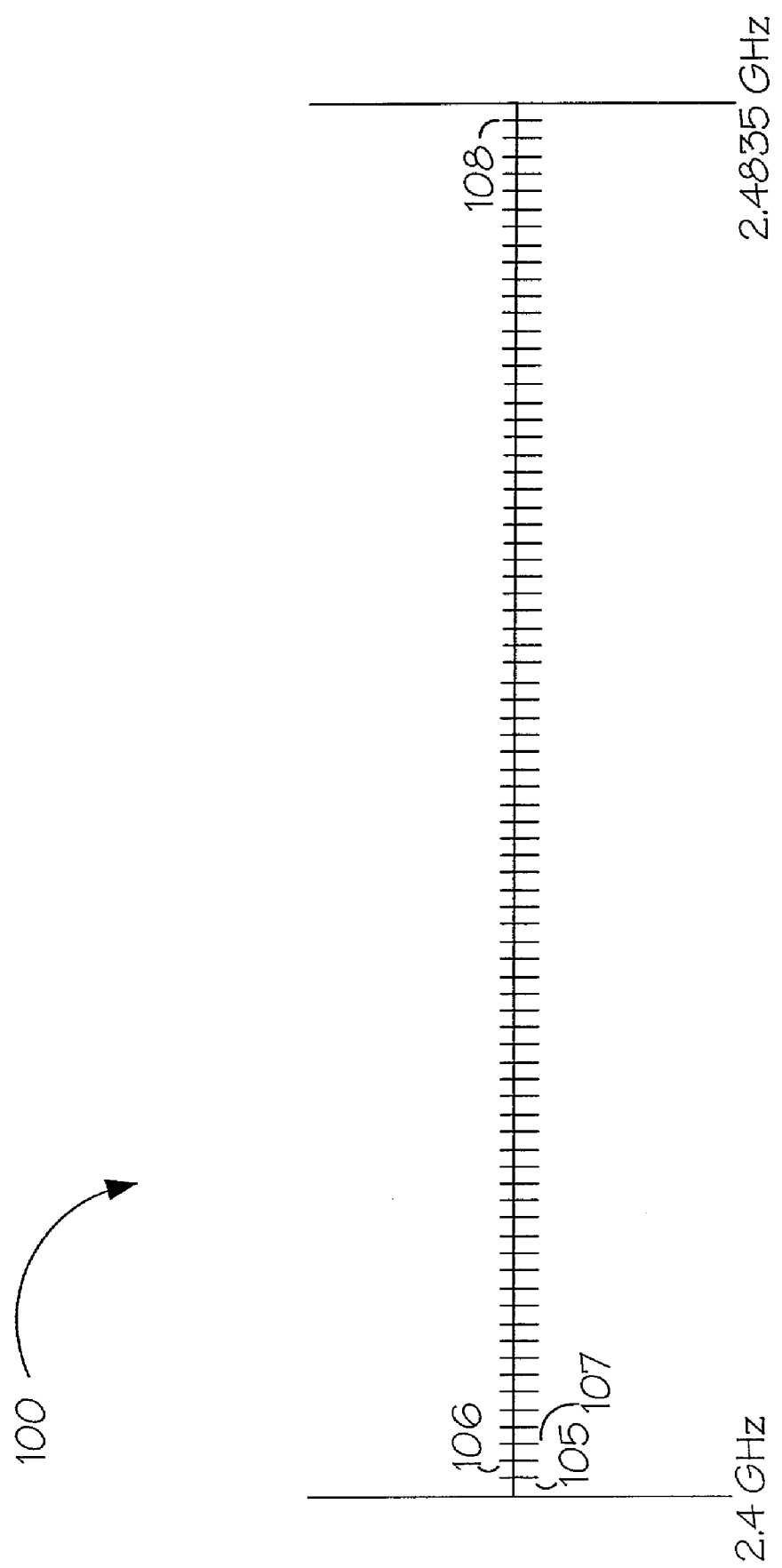
FIG. 1 depicts a diagram representing, as an example of a working frequency band, the 2.4 GHz Industrial, Scientific and Medical (ISM) band and its available channels for frequency hopping.

Referring to FIG. 1, a diagram representing, as an example of a frequency band, the 2.4 GHz Industrial, Scientific and Medical (ISM) band 100 is shown. It should be understood that the ability to generate a pseudo random sequence in accordance with the present invention may be employed on other types of frequency bands, however, the unlicensed 2.4 GHz band is shown for exemplary purposes. When frequency hopping spread spectrum technology is employed, the 2.4 GHz band may be divided into 79 separate 1 MHz channels 105–108 from 2.4 GHz to 2.4835 GHz. It should be understood that the ISM band is slightly modified in France, Spain and Japan but would not affect the operation of the present invention and necessarily would not depart from the scope and spirit of the present invention. Frequency hopping technology utilizes all of the available channels by altering the center frequency of the conventional carrier (also known to the art as hopping) to the channels of the bandwidth according to a pseudo random sequence. According to the BLUETOOTH specification, transmitters change frequencies at a rate of 1600 times per second.

In accordance with the present invention, a plurality of channels 105–108 may be associated with a unique and distinct pseudo random sequence. In an embodiment of the invention, each channel of a frequency band may be associated with a pseudo random sequence. A pseudo random sequence may be a set of bits referring to a set of randomly chosen numbers. The pseudo random sequence may be retrieved by an apparatus operating in accordance with the present invention through a look-up table or similar mechanism and could be utilized to create a hop set for a frequency hopping spread spectrum system. For example, channel 105 may be associated with a first pseudo random sequence while channel 106 may be associated with a second sequence. A separate and distinct sequence may be associated with a channel, for example each channel of the 79 channels of the 2.4 GHz band may be associated with a distinct sequence. Randomness may be additionally generated by the selection of the particular channel or frequency in a pseudo random fashion. For example, in alternative embodiments of the present invention, the sequence utilized may be associated with the last channel used by the system, a next channel, a low received signal strength channel, a high noise channel.

Figure 2:
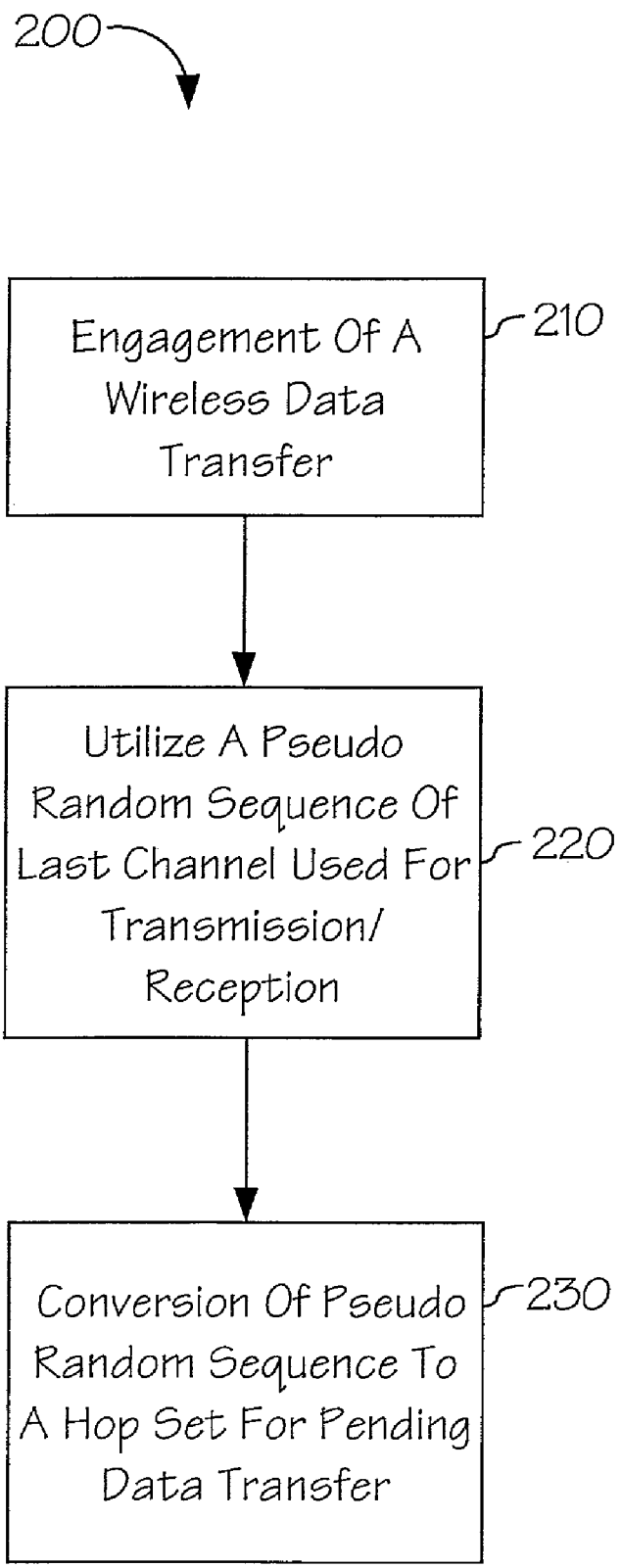
FIG. 2 depicts an embodiment of a process for generating a pseudo random sequence in accordance with the present invention.

Referring now to FIG. 2, an embodiment of a process for generating a pseudo random sequence 200 in accordance with the present invention is shown. The process may begin upon engagement of a wireless data transfer 210. For example, a user of a computer may have initiated a print request. A printer may be operatively coupled to the computer via a wireless connection such as a BLUETOOTH wireless connection. Upon the last use of the transmitter, the carrier frequency may be located on a channel A upon termination of the last data transfer. Therefore, a pseudo random sequence associated with channel A may be utilized 220. A hop set for the pending data transfer may be created by converting the pseudo random sequence associated with the last utilized channel to a hop set for the pending data transfer 230. Thus, both the receiver and transmitter would employ the hop set created from the pseudo random sequence associated with the last utilized channel.

An advantageous aspect of the present invention is the ability to prevent interception. Since a unique hop set may be associated with each channel, eavesdroppers may not be capable of learning the hop set since it will continually vary according to the last channel utilized. Additionally, creation of a hop set according to process 200 of the present invention may not require additional hardware circuitry and processor action.

In an embodiment of the invention, process 200 may be further enhanced to prevent interception by executing steps 220 and 230 of process 200 of the present invention at regular intervals. After a certain period of time during the pending data transfer, the last channel used at the expiration of the period may be determined, channel B for example. A pseudo random sequence associated with channel B may be converted to a new hop set. Conversion of multiple pseudo random sequences at regular intervals may help ensure a desired level of randomness while preventing interception by eavesdroppers. Since the process does not require the execution of an algorithm, a hop set may be created from a pseudo random sequence easily thus providing a unique hop set in nearly real-time.

In alternative embodiments of the present invention, alternative channels may be utilized as the channel from which a pseudo random sequence may be extracted. For example, the last channel utilized in the last data transfer session may be known. With this reference, another channel may be selected based upon the last channel utilized in a previous or pending data transfer session. For example, the next higher frequency or next lower frequency channel may be utilized. Additionally, a channel located a certain number of increments from the last channel may be selected. As an example, a channel E may be selected because it is five channels away from the last channel A. It should be understood by those with ordinary skill in the art that many ways of selecting a channel exist based upon a known reference and may be utilized in accordance with the present invention which will not depart from the scope and spirit of the present invention.

Figure 3:
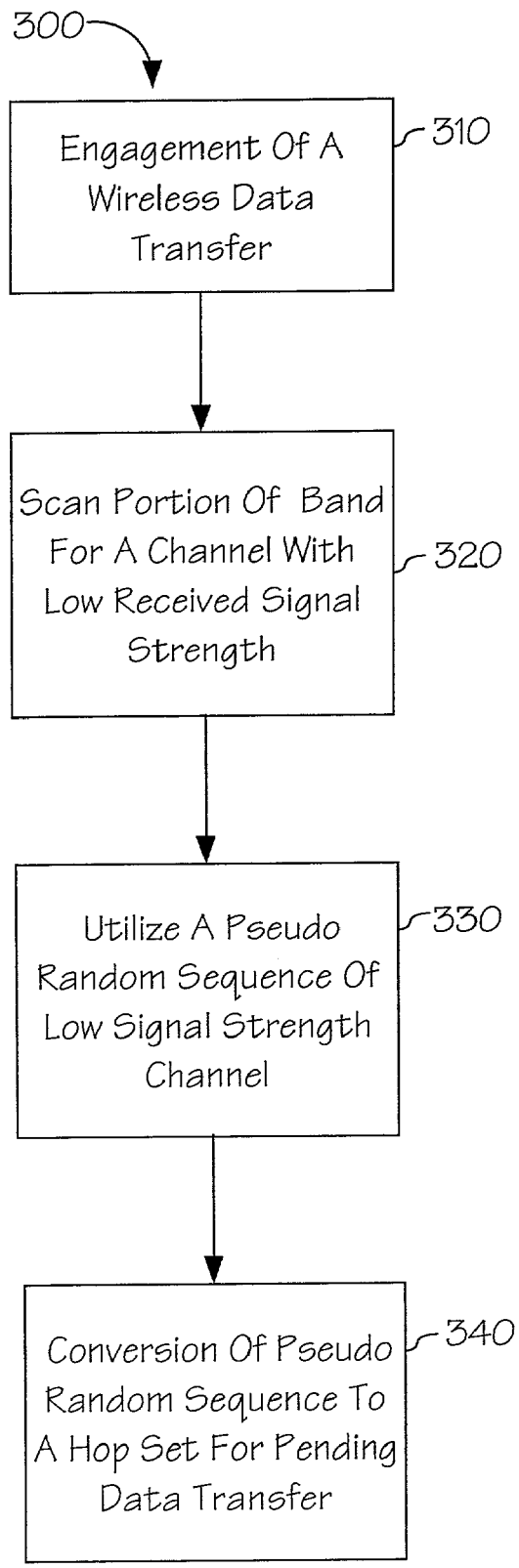
FIG. 3 depicts an alternative embodiment of a process for generating a pseudo random sequence in accordance with the present invention.

Referring now to FIG. 3, an alternative embodiment of a process for generating a pseudo random sequence 300 in accordance with the present invention is shown. The process may begin upon engagement of a wireless data transfer 310. As a first transceiver and second transceiver are engaged for a wireless data transfer, each scan at least a portion of the band for a channel with a low received signal strength 320. It should be understood by those with ordinary skill in the art that the entire band may be scanned to detect a low received signal strength channel without departing from the scope and spirit of the present invention. Once this channel has been detected, a pseudo random sequence associated with the low signal strength channel may be utilized 330. A hop set for the pending data transfer may be created by converting the pseudo random sequence associated with the low signal strength channel to a hop set for the pending data transfer 340. Thus, both the first and second transceiver would employ the hop set created from the pseudo random sequence associated with the low signal strength channel.

Figure 4:
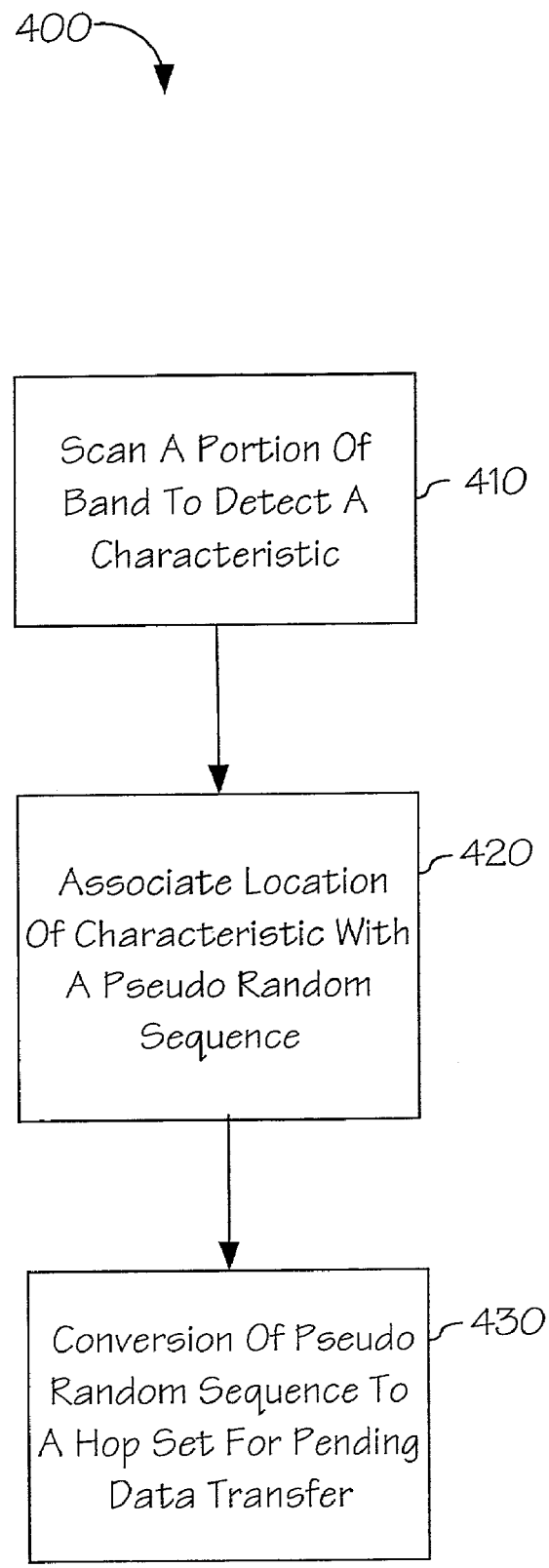
FIG. 4 depicts an embodiment for generating a pseudo random sequence by scanning for a characteristic in a spread spectrum system in accordance with the present invention.

Referring to FIG. 4, an embodiment for generating a pseudo random sequence 400 by detecting a characteristic in a spread spectrum system in accordance with the present invention is shown. A characteristic may include, but is not limited to, a change in amplitude, frequency, period, and the like. In one embodiment of the invention, the characteristic may be a change in noise. Noise may refer to unwanted disturbances imposed upon a spread spectrum signal. The process may begin upon the engagement of a wireless data transfer. As a first transceiver and second transceiver are engaged for a wireless data transfer, each scan a portion of the entire band for a characteristic 410. For example, a snapshot of the frequency band may be analyzed at an instant in time and variations in noise characteristics may be detected. The location of the characteristic in relation to the frequency band may determine the content of the pseudo random sequence. In an alternative embodiment of the invention, the entire band may be scanned.

In an embodiment of the invention, characteristics of additive white Gaussian noise may be detected. Similar to processes 200 and 300 of the present invention, the detection of a characteristic may be associated with a distinct pseudo random sequence 420. It should be understood by those with ordinary skill in the art that other types of noise characteristics may be detected other than characteristics associated with additive white Gaussian noise without departing from the scope and spirit of the present invention. A hop set for the pending data transfer may be created by converting the pseudo random sequence associated with location of the characteristic to a hop set for the pending data transfer 430.

In an alternative embodiment of the process of FIG. 4, a channel with a low received signal strength may be detected. A channel with low received signal strength may be accompanied by a more measurable amount of noise. The location of a noise characteristic in relation to the channel with low received signal strength may be associated with a pseudo random sequence which may be converted to a hop set in accordance with the present invention. While a channel with a low received signal strength could be used for the detection of noise, other channels may also be utilized to detect noise without departing from the scope and spirit of the present invention.

In order to ensure proper transmission and reception of wireless spread spectrum signals, multiple transceivers may require synchronous frequency hopping. Thus, a first transceiver may require execution of a hop set synchronously with a second transceiver executing the same hop set. In accordance with the present invention and operation of processes 200, 300 and 400 of the present invention, this may require similar detection of a low received signal strength channel, similar detection of a noise characteristic, and the like. This may be accomplished in accordance with the present invention by conventional amplification and filtering of spread spectrum signals such that the signal strength and noise characteristic is detected similarly by multiple transceivers. Additionally, a master product may employ a timing signal received by all slave products to ensure proper timing of operations. For example, timing may be accomplished according to specifications as prescribed by the BLUETOOTH specification. Additionally, in an embodiment of the invention if synchronization is lost, a revival scheme may be employed by the products of the wireless system to aid in regaining synchronization. The revival scheme may include but is not limited to the execution a particular hop set at a designated time.

In the execution processes 200, 300 and 400 of the present invention, steps include the retrieval of a pseudo random sequence and the conversion to a hop set for a frequency hopping spread spectrum system. In an embodiment of the invention, the pseudo random sequence may refer to a unique set of numbers. The set of numbers may be utilized by an apparatus performing processes 200, 300 and 400 of the present invention to generate a hop set for a frequency hopping spread spectrum system. In one embodiment of the invention, the set of numbers may refer to a list of channels in which the system will hop to in a data transfer.

In alternative embodiments of the invention, a pseudo random sequence may be utilized and inserted into a mathematical operation or function to derive a hop set. It should be understood by those with ordinary skill in the art that multiple methods of deriving a hop set from a pseudo random sequence may be utilized by one with ordinary skill in the art without departing from scope and spirit of the present invention.

Figure 5:
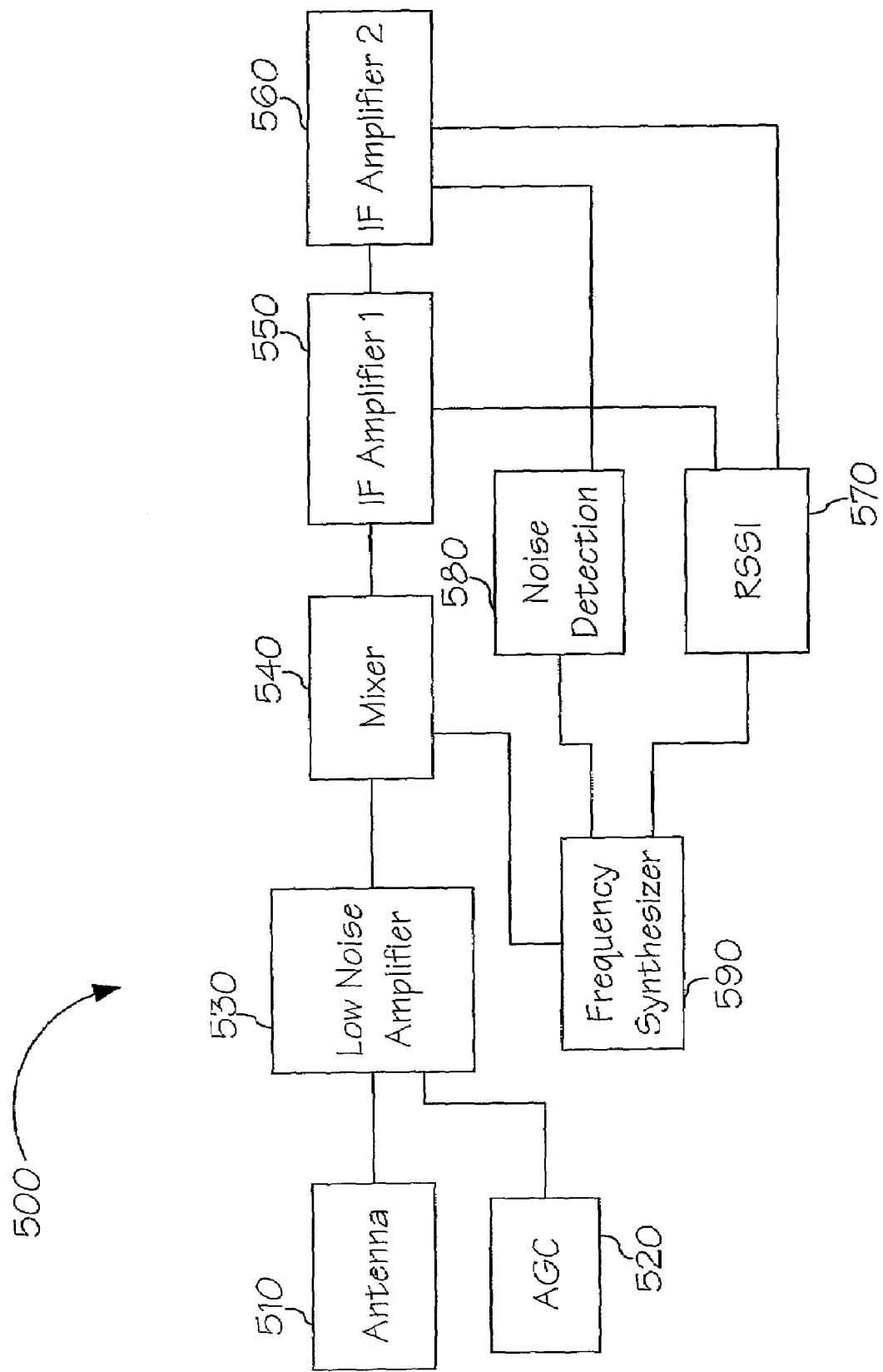
FIG. 5 depicts an embodiment of a transceiver for implementing processes 200, 300 and 400 of the present invention.

Referring now to FIG. 5, an embodiment of a transceiver 500 for implementing processes 200, 300 and 400 of the present invention is shown. Transceiver may include an antenna 510, automatic gain controller 520 and a low noise amplifier 530 to aid in the reception of signals. The received signal may be sent through a mixer 540 and a first and second intermediate frequency amplifier 550, 560. Mixer 540 along with intermediate frequency amplifiers 550, 560 may be utilized to scan a frequency band. A received signal strength indicator 570 and noise detector 580 may be coupled to the intermediate frequency amplifiers 550, 560. Upon a scan of the band, the received signal strength indicator 570 and noise detector 580 may determine the relative strength of the received signal for each channel and may detect a particular noise characteristic located within the frequency band. It should also be understood that noise detector 580 may detect a characteristic of the spread spectrum system other than noise, such as a change in amplitude, frequency and period.

The information retrieved by the received signal strength indicator and noise detector may be analyzed by the frequency synthesizer 590. Frequency synthesizer may include a database of information which may refer a pseudo random sequence with each respective channel in the band. Based upon a channel with low signal strength, a pseudo random sequence associated with the low signal strength channel may be converted to a hop set. Frequency synthesizer 590 may also be capable of retrieving a last utilized channel as required for implementation of process 200 of the present invention by registering the channel hop set and the last channel utilized. It should also be understood by those with ordinary skill in the art that frequency synthesizer 590 of the present invention may be capable of associating a pseudo random sequence in accordance with a pseudo random channel selection, for example, a low received signal strength channel, and may convert the pseudo random sequence into a hop set for a frequency hopping spread spectrum system.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include change changes.

What is claimed is:

1. A method for selecting a pseudo random sequence for a spread spectrum system, comprising:

associating a plurality of distinct pseudo random sequences for a plurality of channels of a frequency band in which the spread spectrum system operates, each channel of the plurality of channels being associated with a single distinct pseudo random sequence of the plurality of distinct pseudo random sequences;

selecting a channel according to a triggering event in a pseudo random fashion; and generating a hop set based on the distinct pseudo random sequence of the selected channel, wherein the hop set is utilized in the operation of a frequency hopping spread spectrum transmission.

2. The method according to claim 1 whereby the triggering event includes receipt of a data transfer request.

3. The method according to claim 1, including repeating the distinct pseudo random sequence upon a predetermined period of time.

4. The method according to claim 1, whereby the pseudo random fashion includes selecting the channel according to a last channel utilized in a previous data transfer.

5. The method according to claim 4 including selecting the channel located a certain number of increments from the last channel.

6. The method according to claim 1, whereby the pseudo random fashion includes selecting the channel according to a channel with a low received signal strength of a portion of the frequency band.

7. A method of selecting a pseudo random sequence for a spread spectrum system, comprising:
associating a plurality of pseudo random sequences with a plurality of frequencies or ranges of frequencies of a frequency band in which the spread spectrum system operates, each frequency or range of frequencies of the plurality of frequencies or ranges of frequencies being associated with a single distinct pseudo random sequence of the plurality of pseudo random sequences;
scanning at least a portion of the frequency band in which the spread spectrum system operates;
identifying the frequency or range of frequencies in the frequency band in which a characteristic is detected;
determining the pseudo random sequence associated with the frequency or range of frequencies; generating a hop set based on the determined pseudo random sequence.

8. The method according to claim 7 including converting the pseudo random sequence to a hop set for a frequency hopping spread spectrum transmission.

9. The method according to claim 7, whereby the characteristic includes a change in at least one of frequency and period.

10. The method according to claim 7, whereby the characteristic is a change in noise present in the frequency or range of frequencies.

11. The method according to claim 7, whereby the frequency or range of frequencies refers to a channel in the frequency band.

12. The method according to claim 7, whereby associating the pseudo random sequence with the frequency or range of frequencies does not require execution of an algorithm.

13. An apparatus for selecting a pseudo random sequence for a spread spectrum system, comprising:
means for associating a plurality of pseudo random sequences with a plurality of frequencies or ranges of frequencies of a frequency band in which the spread spectrum system operates, each frequency or range of frequencies of the plurality of frequencies or ranges of frequencies being associated with a single distinct pseudo random sequence of the plurality of pseudo random sequences;
means for scanning at least a portion of the frequency band in which the spread spectrum system operates;
means for identifying the frequency or range of frequencies in the frequency band in which a characteristic is detected;
means for associating the pseudo random sequence with the frequency or range of frequencies; and means for generating a hop set based on the associated pseudo random sequence.

14. The apparatus as claimed in claim 13, wherein the characteristic includes a change in at least one of frequency and period.

15. The apparatus as claimed in 14, wherein the characteristic is a change in noise present in said frequency band of said spread spectrum system.

16. The apparatus according to claim 13, wherein the frequency or range of frequencies refers to a channel in the frequency band.

17. The apparatus according to claim 13, wherein associating means includes a frequency synthesizer and database.

18. The method according to claim 1 whereby the pseudo random fashion-includes detecting a high noise channel.

19. The method according to claim 1 whereby the triggering event is the completion of a predetermined period of time and the selected channel is determined from a last channel utilized during the predetermined period of time, the method further comprising:
selecting the distinct pseudo random sequence; and
using the hop set to vary channel selection during a communication session.

20. The method according to claim 19 whereby the distinct pseudo random sequence is associated with the selected channel that is located a certain number of channels from the last channel.

21. The method according to claim 7 including synchronizing a frequency hopping among multiple receivers that similarly detect the characteristic.

22. The method according to claim 10 whereby the pseudo random sequence is determined according to a channel having a low received signal strength in which the change in noise is present.

23. The method according to claim 7 including:
extracting the characteristic from a channel that includes the frequency or range of frequencies;
providing a table having unique pseudo random sequences;
selecting one of the pseudo random sequences associated with the channel;
converting the pseudo random sequence to a hop set; and using the hop set to vary channel selection during a frequency hopping spread spectrum transmission session.

* * * * *